(12) United States Patent
Magnan et al.

(10) Patent No.: US 8,056,534 B2
(45) Date of Patent: Nov. 15, 2011

(54) INTAKE MANIFOLD SYSTEM FOR INTERNAL COMBUSTION ENGINE

(75) Inventors: Michael Bruno Magnan, Dearborn, MI (US); Katherine Jane Randall, Dearborn Heights, MI (US); Christopher William Newman, Farmington Hills, MI (US)

(73) Assignee: Ford Global Technologies, Dearborn, MI (US)

( * ) Notice: Subject to any disclaimer, the term of this patent is extended or adjusted under 35 U.S.C. 154(b) by 418 days.

(21) Appl. No.: 12/470,533

(22) Filed: May 22, 2009

(65) Prior Publication Data

US 2010/0294227 A1 Nov. 25, 2010

(51) Int. Cl.
*F02B 31/06* (2006.01)
*F02D 9/10* (2006.01)

(52) U.S. Cl. .......................... 123/336; 123/308; 123/432

(58) Field of Classification Search ................. 123/306, 123/308, 336, 432
See application file for complete search history.

(56) References Cited

U.S. PATENT DOCUMENTS

| | | | |
|---|---|---|---|
| 4,180,041 A | 12/1979 | Miyazaki et al. | |
| 4,819,953 A | 4/1989 | Joh | |
| 5,005,535 A * | 4/1991 | Binversie et al. | ........ 123/184.39 |
| 5,107,804 A | 4/1992 | Becker et al. | |
| 5,145,190 A | 9/1992 | Boardman | |
| 5,267,543 A | 12/1993 | Novak et al. | |
| 5,280,769 A | 1/1994 | Yates | |
| 5,657,725 A | 8/1997 | Butterfield et al. | |
| 5,704,333 A | 1/1998 | Okumura et al. | |
| 5,875,758 A * | 3/1999 | Fujita | ............. 123/336 |
| 5,957,464 A | 9/1999 | Elliott | |
| 6,055,806 A | 5/2000 | Dalton | |
| 6,311,986 B1 | 11/2001 | Richardson et al. | |
| 6,604,506 B2 * | 8/2003 | Tanaka et al. | ................. 123/336 |
| 6,662,772 B1 | 12/2003 | Murphy | |
| 6,763,802 B1 | 7/2004 | Brassell | |
| 7,096,849 B1 | 8/2006 | Mathis et al. | |
| 7,293,546 B1 * | 11/2007 | Confer et al. | ................. 123/308 |
| 7,337,758 B2 | 3/2008 | Sturdy et al. | |
| 7,552,710 B2 * | 6/2009 | Lancioni et al. | .............. 123/336 |
| 7,624,715 B2 * | 12/2009 | Goldin et al. | ................. 123/336 |
| 2004/0134192 A1 | 7/2004 | Umehara et al. | |
| 2005/0179215 A1 | 8/2005 | Kono | |
| 2007/0017468 A1 | 1/2007 | Letourneau et al. | |
| 2007/0044754 A1 * | 3/2007 | Peffley et al. | ................. 123/306 |
| 2008/0035107 A1 * | 2/2008 | Torii | .............. 123/336 |
| 2008/0271697 A1 | 11/2008 | Vichinsky | |

FOREIGN PATENT DOCUMENTS

JP 2002106428 A 4/2002

* cited by examiner

*Primary Examiner* — Erick Solis
(74) *Attorney, Agent, or Firm* — Jerome R. Drouillard; Julia Voutyras

(57) ABSTRACT

An intake manifold system for an internal combustion engine includes inlet runners attached to a mounting flange. The inlet runners may be one piece with the mounting flange. A charge air control is mounted within the mounting flange, with the charge air control including a control shaft passage formed in the mounting flange, and a control shaft extending the length of the control shaft passage. The control shaft is journaled within the control shaft passage and carries a number of charge air control elements mounted for rotation with the control shaft.

16 Claims, 3 Drawing Sheets

INTAKE MANIFOLD SYSTEM FOR INTERNAL COMBUSTION ENGINE

BACKGROUND OF THE DISCLOSURE

1. Field of the Disclosure

The present disclosure relates to an intake manifold for an internal combustion engine. The inventive intake manifold has the ability to control the motion of charge air passing through the manifold.

2. Related Art

The ability to control pre-combustion charge motion of air entering the cylinders of an internal combustion engine has grown appreciably more important as emissions standards and fuel economy requirements have become increasingly more stringent. Although it is known to employ charge motion control devices and intake runner control valves with internal combustion engines, such devices typically increase the complexity and package volume of an engine by necessitating their placement within a spacer located between the upper and lower intake manifolds, for example. This type of construction is shown in FIG. 4, in which a spacer, 102, containing airflow control elements 103, is mounted between an upper intake manifold, 104, and a cylinder head or lower intake manifold (not shown). Other known charge motion control devices include a control shaft journaled within an oversized mounting flange. In this construction, a separate retainer plate, secured in place with threaded fasteners, maintains the control shaft in place. This construction, too, is characterized by undesirable expanded package volume and complexity, as well as excessive cost.

It would be desirable to provide charge air motion control with an intake manifold that does not require either an additional component such as a spacer having a built-in charge motion control device, or added package volume which increases the installed space required by the intake system of an engine.

SUMMARY

According to an aspect of the present disclosure, an intake manifold system for an internal combustion engine includes a number of inlet runners, with a mounting flange connecting the inlet runners. A charge air control is located within the mounting flange, with the charge air control including a control shaft passage formed in the mounting flange, and with the control shaft passage being configured as a channel opening into a cylinder head engaging surface of the mounting flange. A control shaft extends the length of the control shaft passage. The control shaft is journaled within the control shaft passage. A number of charge air control elements are mounted to the control shaft.

According to another aspect of the present disclosure, an intake manifold system further includes a controller for operating a control shaft and attached charge air control elements to change a flow characteristic of charge air passing through the manifold's inlet runners. In a preferred embodiment, the mounting flange and inlet runners are one piece.

A controller operates the control shaft and charge air elements by positioning the control shaft rotationally. According to another aspect of the present disclosure, the charge air control elements may include charge motion control valves, as well as runner control valves. As used herein, the term "charge motion control valve" ("CMCV") means a valve which can cause flow through a manifold runner to tumble or swirl, or to cause charge motion to be confined to one portion of an intake port of a cylinder head. On the other hand, a "runner control valve" means a valve which substantially closes off or prevents flow through a passage. Runner control valves are often used for promoting charge motion.

According to another aspect of the present disclosure, an intake manifold further includes a sealing composition applied as a continuous loop to an outer periphery of the manifold's mounting flange, so that leakage of air past the mounting flange and into an engine will be prevented, while permitting air exchange between adjacent ones of the inlet runners.

It is an advantage of an intake manifold system according to the present disclosure that the installed dimensions of the intake manifold system, and frequently, its installed height, will be reduced as compared with known manifolds having associated charge motion control systems, which require a "sandwiched" component between the upper intake manifold and lower intake manifold, or cylinder head, of an engine.

It is another advantage of an intake manifold system according to the present disclosure that cost of the charge air system will be less than that incurred with separate manifold and charge motion control components, because fewer sealing provisions and assembly steps are required.

It is yet another advantage of an intake manifold system according to the present disclosure that an identical intake manifold casting design may be utilized for engines without charge air control and engines with charge air control, because the charge air control of the present disclosure may be accommodated by machining a blank manifold having no special provisions other than ones introduced by machining as required for mounting a control shaft and charge air control elements attached to the control shaft.

Other advantages, as well as features of the present system, will become apparent to the reader of this specification.

DETAILED DESCRIPTION OF THE PREFERRED EMBODIMENTS

Figure 1:
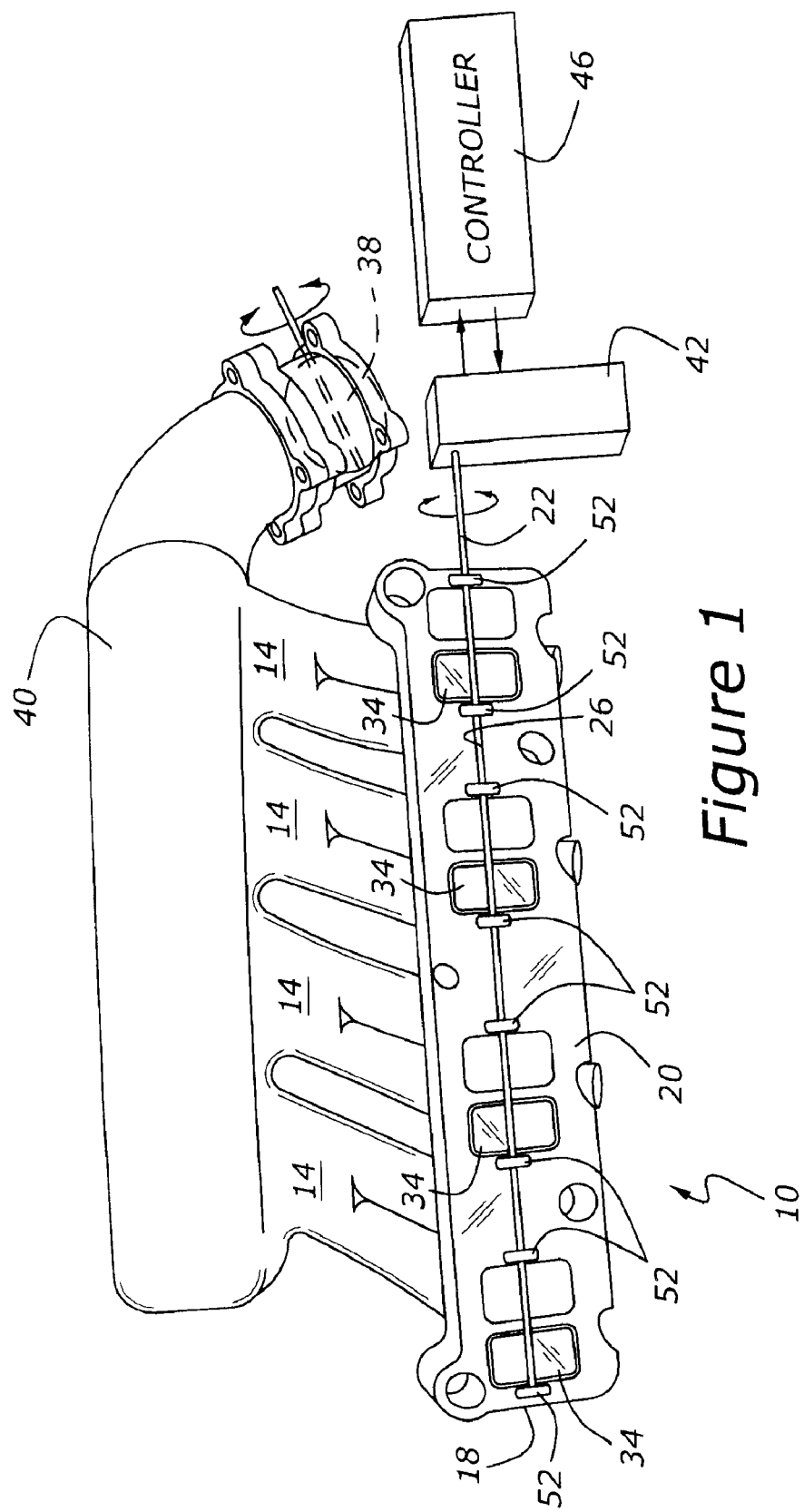
FIG. 1 is a partially schematic view of an intake manifold system according to an aspect of the present disclosure.
Figure 2:
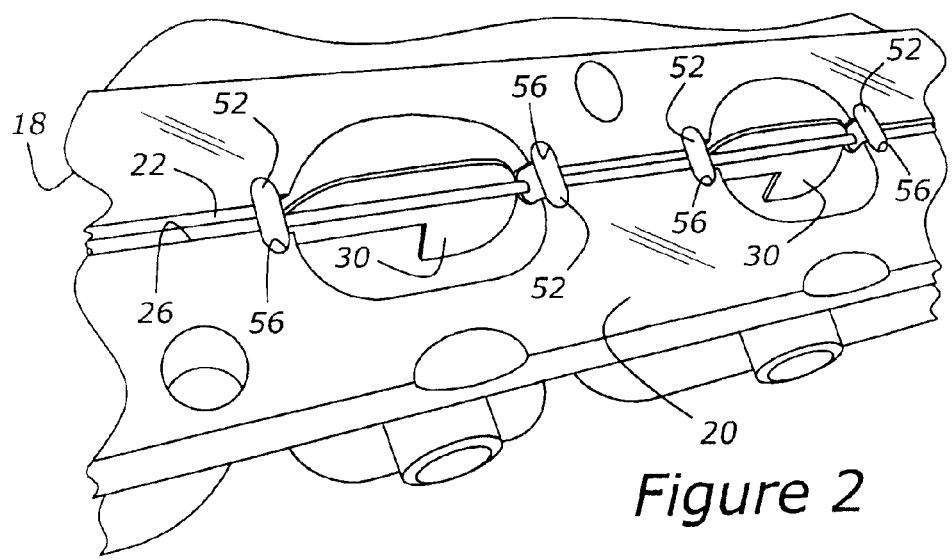
FIG. 2 is a perspective view of a portion of the intake manifold system of the present disclosure showing with particularity a mounting flange and cylinder head engaging surface of the mounting flange.
Figure 3:
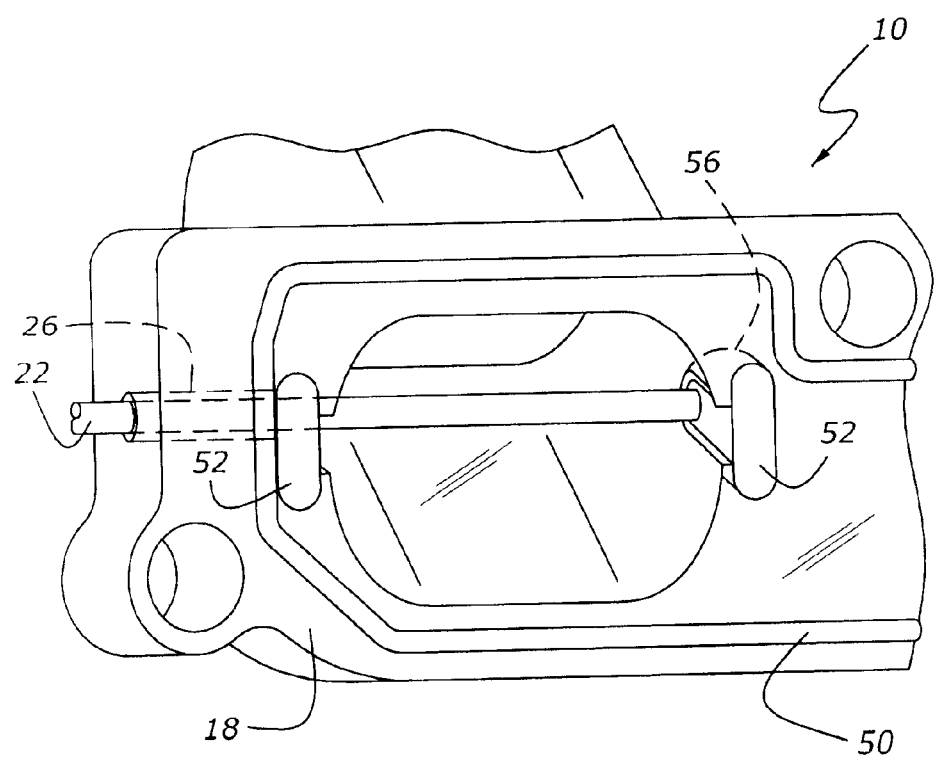
FIG. 3 is a perspective view showing details of a control shaft mounting according to an aspect of the present disclosure.
Figure 4:
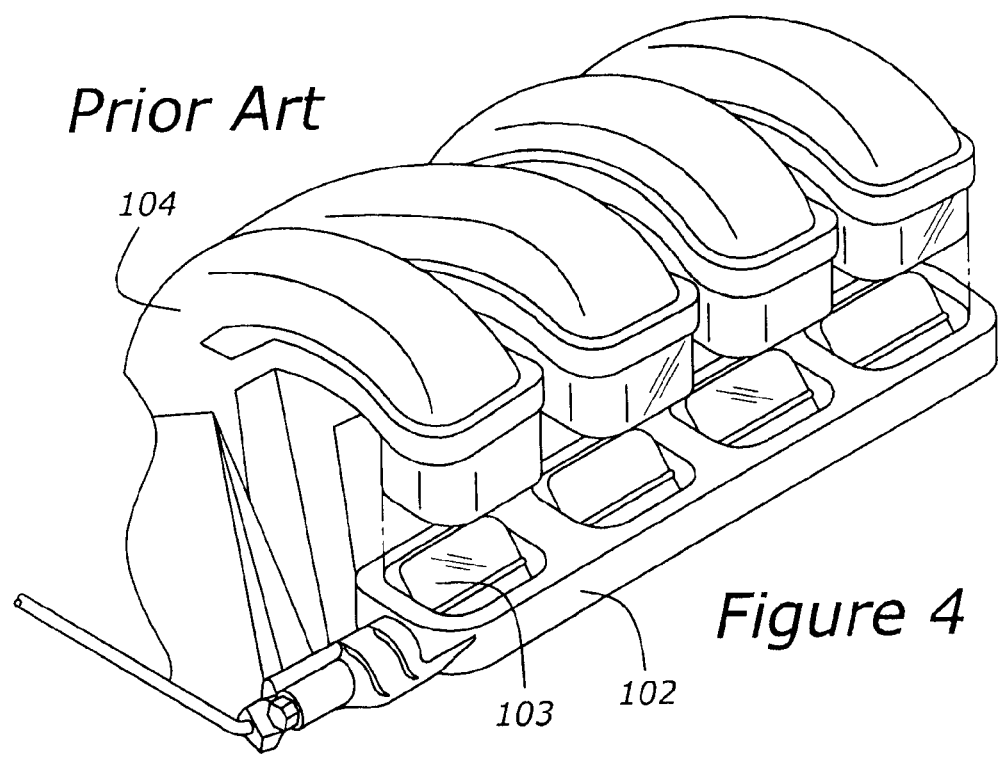
FIG. 4 is a perspective view showing details of a prior art control shaft mounting which uses a spacer to accommodate the control shaft.

As shown in FIG. 1, an intake manifold system, 10, has a number of inlet runners, 14, extending from a throttle valve, 38, and plenum, 40, to a mounting flange, 18. Runners 14 are preferably one-piece with mounting flange 18. Mounting flange 18 has a cylinder head engaging surface, 20, which is generally planar, and which has a control shaft passage, 26, formed therein. Passage 26 may either be produced by machining of mounting flange 18, or it may be cored and formed during a casting or molding operation. Because control shaft passage 26 is configured as an open channel for most of its length, passage 26 is readily created by either drilling and milling or slotting mounting flange 18. Moreover, those skilled in the art will appreciate in view of this disclosure that other methods may be employed for forming control shaft passage 26. In any event, control shaft passage 26 houses a control shaft, 22, having a number of charge air control elements contained thereupon. These elements may include charge motion control valves, shown at 30 in FIG. 2, runner control valves shown at 34 in FIG. 1, or other types of elements which change the flow characteristics through the manifold's runners. Alternatively, more than one type of device, e.g., charge motion control valves and runner control valves, may be employed in a single intake manifold system. Charge motion control valves 30 are illustrated as having one-quarter of the valve plate removed, so as to cause air flowing through a manifold runner to be re-directed. Those skilled in the art will appreciate in view of this disclosure that although runners 14 are shown as being bifurcated, in FIG. 1, FIGS. 2 and 3 show a non-bifurcated runner system, the point being that the present system is useful with both types of charge air control elements. Those skilled in the art will further appreciate that the present system may be employed with intake manifolds rendered in various metals, nonmetals, and composites, either by traditional casting methods, or as shell welded assemblies, or yet other types of construction.

FIG. 1 also shows a control motor, 42, and controller 46, which rotationally positions control shaft 22 and charge air control elements whether they be CMCV 30 or runner control valves 34, or both.

FIG. 2 illustrates control shaft 22 as being journaled within mounting flange 18 by a number of bearing sections configured as bushings, 52, which fit within bushing apertures 56. Each of bushing apertures 56 extends within mounting flange 18 from control shaft passage 26 to cylinder head engaging surface 20. In a preferred embodiment, bushings 52 are molded from an elastomeric compound which is sized to fit in a compressed state within bushing apertures 56, and is in effect clamped and retained within bushing apertures 56 by clamping force applied by a cylinder head (not shown) which abuts each of bushings 52 when mounting flange 18 has been attached to the cylinder head of an engine. FIG. 3 shows more detail of bushing apertures 56 and bushings 52, as well as shaft 22.

As shown in FIG. 3, the present intake manifold system preferably further includes a sealing composition, 50, applied as a continuous loop to an outer periphery of mounting flange 18 so as to prevent the leakage of air past mounting flange 18 and into an engine to which the present intake manifold system is attached. Because sealing composition 50 need not extend between the various runners, limited air exchange will be permitted between adjacent ones of the inlet runners. Testing has shown that this air exchange will not appreciably degrade induction system tuning, provided bushings 52 impose a reasonable restriction upon pressure pulses seeking to communicate between runners 14 parallel to control shaft 22.

The foregoing system has been described in accordance with the relevant legal standards, thus the description is exemplary rather than limiting in nature. Variations and modifications to the disclosed embodiment may become apparent to those skilled in the art and fall within the scope of the disclosure. Accordingly the scope of legal protection can only be determined by studying the following claims.

What is claimed is:

1. An intake manifold system for an internal combustion engine, comprising:
　a plurality of inlet runners;
　a mounting flange connected to said inlet runners; and
　a charge air control mounted within said mounting flange, with said charge air control comprising:
　　a control shaft passage formed in said mounting flange, with said control shaft passage being configured as a channel opening into a cylinder head engaging surface of said mounting flange;
　　a control shaft extending the length of said control shaft passage, with said control shaft journaled within the control shaft passage; and
　　a plurality of charge air control elements mounted to said control shaft.

2. An intake manifold system according to claim 1, further comprising a controller for operating said control shaft and said charge air control elements to change a flow characteristic of charge air passing through said inlet runners.

3. An intake manifold system according to claim 1, wherein said mounting flange and said inlet runners are one-piece.

4. An intake manifold according to claim 2, wherein said controller operates said control shaft and said charge air elements by positioning said control shaft rotationally.

5. An intake manifold according to claim 1, wherein said charge air control elements comprise charge motion control valves.

6. An intake manifold according to claim 1, further comprising a plurality of bearing sections placed about said control shaft, with each of said bearing sections being housed within an aperture formed in said mounting flange and extending from said control shaft passage to the cylinder head engaging surface.

7. An intake manifold according to claim 6, wherein said bearing sections comprise elastomeric bushings held compressively between a cylinder head and said mounting flange.

8. An intake manifold according to claim 1, wherein said charge air control elements comprise runner control valves.

9. An intake manifold according to claim 1, further comprising a throttle for controlling mass airflow through said manifold.

10. An intake manifold according to claim 1, further comprising a sealing composition applied as a continuous loop to an outer periphery of said mounting flange, whereby leakage of air past the mounting flange and into an engine will be prevented, while permitting air exchange between adjacent ones of said inlet runners.

11. An intake manifold system for an internal combustion engine, comprising:
　a plurality of inlet runners for conducting charge air from a throttle body to a mounting flange;
　a throttle, mounted within said throttle body, for controlling the amount of charge air flowing through said inlet runners;
　a one-piece mounting flange connected to said inlet runners and having a cylinder head engaging surface; and
　a charge air control mounted within said mounting flange, with said charge air control comprising:
　　a control shaft passage formed in said mounting flange, with said control shaft passage being configured as a channel extending along the length of the mounting flange and opening into said cylinder head engaging surface;
　　a control shaft extending the length of said control shaft passage, with said control shaft journaled within the control shaft passage upon a plurality of bushings retained within apertures extending within said mounting flange from said control shaft passage to said cylinder head engaging surface; and
　　a plurality of rotatable charge air control elements mounted to said control shaft; and
　　a controller for rotatably positioning said control shaft and said charge air control elements to change a physical flow characteristic of charge air passing through said inlet runners and into intake ports configured within a cylinder head.

12. An intake manifold according to claim 11, wherein said charge air control elements comprise charge motion control valves.

13. An intake manifold according to claim 11, wherein said charge air control elements comprise runner control valves.

14. An intake manifold according to claim 11, further comprising a sealing region circumscribing only an outer periphery of said mounting flange.

15. An intake manifold according to claim 11, wherein said control shaft passage is configured as a partially open channel.

16. An intake manifold according to claim 11, wherein said control shaft bushings comprise elastomeric bushings configured to fit in a compressed state within said apertures extending within said mounting flange.

* * * * *